United States Patent [19]

Keller

[11] 4,033,369

[45] July 5, 1977

[54] SAFETY CONNECTOR FOR PRESSURE TANK

[75] Inventor: Russell D. Keller, Clackamas, Oreg.

[73] Assignee: Temco Metal Products Company, Inc., Clackamas, Oreg.

[22] Filed: Nov. 3, 1975

[21] Appl. No.: 628,377

[52] U.S. Cl. .......................... 137/68 R; 188/151 A; 220/3; 220/89 A; 220/288; 285/2; 285/13
[51] Int. Cl.² ........................................ F16K 17/00
[58] Field of Search .................. 285/2, 3, 1, 13; 137/67, 68; 220/3, 288, 289, 202, 203, 303, 88 R, 89 A, 366; 188/151 A

[56] References Cited

UNITED STATES PATENTS

| | | | |
|---|---|---|---|
| 1,758,869 | 5/1930 | Trageser et al. | 285/201 |
| 2,015,904 | 10/1935 | Marsh et al. | 220/3 |
| 2,230,241 | 2/1941 | Franklin | 220/288 |
| 2,238,102 | 4/1941 | Eisinga | 220/288 |
| 2,460,721 | 2/1949 | Thompson | 220/288 |
| 3,152,718 | 10/1964 | Weatherhead, Jr. | 220/3 |
| 3,359,013 | 12/1967 | Knox et al. | 285/13 |
| 3,393,512 | 7/1968 | Puma | 188/151 A |

FOREIGN PATENTS OR APPLICATIONS 237,822   8/1925   United Kingdom ............... 220/288

*Primary Examiner*—William Price
*Assistant Examiner*—Allan N. Shoap
*Attorney, Agent, or Firm*—Klarquist, Sparkman, Campbell, Leigh, Hall & Whinston

[57] ABSTRACT

A pressure tank connector is described which is formed integral with the cylindrical side wall portion of the tank so that such connector deforms and acts as a safety valve when the fluid pressure within the tank exceeds a predetermined pressure. The deformed connector produces a space between it and an insert member which enables the pressurized liquid or gas within the tank to slowly leak out through such space. In the preferred embodiment, the connector includes a threaded cylindrical connector portion joined by a conical projection portion to the side wall of the tank. The fluid escapes from the tank through a space formed between the threads of such connector and those of an external fitting screwed into such connector.

10 Claims, 4 Drawing Figures

SAFETY CONNECTOR FOR PRESSURE TANK

BACKGROUND OF THE INVENTION

The subject matter of the present invention relates generally to pressure tank connectors for transmitting a pressurized fluid, which may be liquid or gas, into or out of a tank through an opening surrounded by such connector. More particularly, the pressure tank connector of the present invention is designed to function as an auxiliary safety valve when the pressure within the tank exceeds a safe value, thereby preventing tank explosions.

The safety connector of the present invention is particularly useful on pressurized air tanks used on trucks and other vehicles for operating air brakes. Previously, air brake tanks have exploded due to overpressure conditions caused when the main safety valve in the line to the tank has either been damaged or frozen shut in cold weather. The resulting explosion has caused death and serious injury to many truck drivers.

In the past, pressure tank connectors have usually separate members which are welded into an opening in the tank wall. As a result of use of such welded connectors, the tanks often explode during overpressurized conditions, usually in the vicinity of the weld. This problem has been overcome by the present invention, which forms the safety connector integral with the cylindrical side wall portion of the tank. Thus, when the tank expands slightly during an overpressurized condition, the safety connector is deformed from its normal annular shape into a slightly oblong configuration. This causes the pressurized fluid within the tank to slowly leak out of the tank through the resulting space formed between the threaded portion of the connector and the external fitting threaded into such connector.

Previously it has been known to form pressure tank connectors integral with the tank wall at the top end of the tank, such as the liquefied petroleum gas tank, shown in U.S. Pat. No, 3,152,718 of Weatherhead. However, these connectors are formed in the hemispherical end of the tank and are not provided on the cylindrical side wall portion. As a result, such integral connectors do not function as auxiliary safety valves in the manner of the present invention because they do not deform when the tank expands in overpressurized conditions.

The safety connector of the present invention, formed integral with the cylindrical side wall of the tank, was compared in tests with similar tanks having the same connector formed in the hemispherical end of the tanks. The result was that all four tanks having safety connectors formed integral with the cylindrical side wall, in accordance with the present invention, acted as auxiliary safety valves and relieved pressure within the tank gradually when the tank pressure reached about 700 psi. This is approximately five times the normal operating pressure of the tank, which is 120 psi. However, when four other tanks having the connector formed integral with their hemispherical ends were tested, each tank ruptured and exploded at pressures of 925, 950, 975, and 1125 psi, respectively. The fourth tank ruptured at a higher pressure because it was formed of drawn metal while the others were formed of welded sheet metal. Nowhere is this safety valve feature suggested in the previous patent and the above-mentioned tests prove that an integral connector does not inherently operate this way when positioned on the hemispherical end of the tanks.

SUMMARY OF THE INVENTION

It is therefore one object of the present invention to provide an improved connector for pressure tanks which also functions as an auxiliary safety valve.

Another object of the invention is to provide such a connector which is formed integral with the cylindrical side wall portion of the tank.

A further object of the invention is to provide such a connector which is simple and inexpensive to manufacture.

Still another object of the invention is to provide such a connector which operates as an auxiliary safety valve in a reliable, trouble free manner and is not subject to jamming due to damage or freezing in cold weather.

Still another object of the present invention is to provide such a connector which is adapted to threadedly engage an external fitting inserted into such connector.

BRIEF DESCRIPTION OF DRAWINGS

Other objects and advantages of the present invention will be apparent from the following detailed description of a preferred embodiment thereof, and from the attached drawings, of which.

DESCRIPTION OF PREFERRED EMBODIMENT

Figure 1:
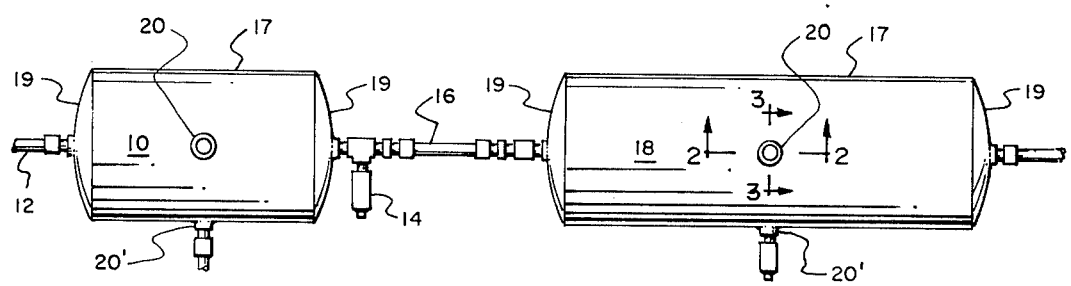
FIG. 1 is a diagrammatic view of an air brake system employing pressure tanks having safety connectors in the manner of the present invention.

As shown in FIG. 1, an air brake system for a truck may include a first pressure tank 10, having an input line 12 connected between the output of an air compressor (not shown) and a conventional input connector in one end of the tank. An output connector of conventional design at the other end of the tank 10 is connected through a line 16 including main safety valve 14 to a conventional input connector at one end of a second pressure tank 18.

Each of the pressure tanks 10 and 18 has a cylindrical side wall 17 whose opposite ends are closed by a pair of hemispherical end portions 19. Safety connectors 20 made in accordance with the present invention are formed integral with the cylindrical side wall 17 of the tanks 10 and 18, and connected by external fittings to side lines which may extend to the air brakes. In addition, tank 18 is provided with a similar safety connector 20' which may be provided with a drain plug or other fitting having a poppet valve, threadedly inserted into the connector for draining water and other undesirable liquid accumulations from the tank.

Figure 2:
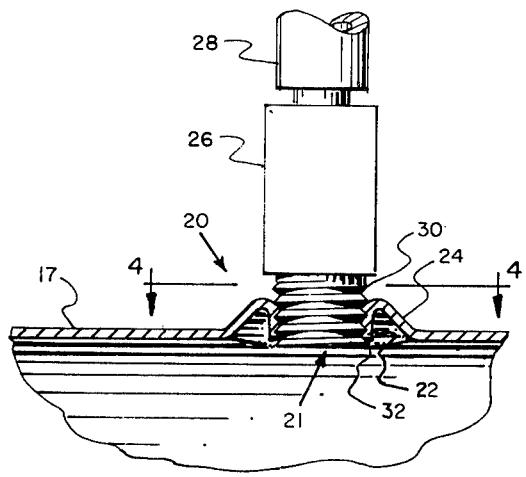
FIG. 2 is an enlarged horizontal section view taken along line 2—2 of FIG. 1.
Figure 3:
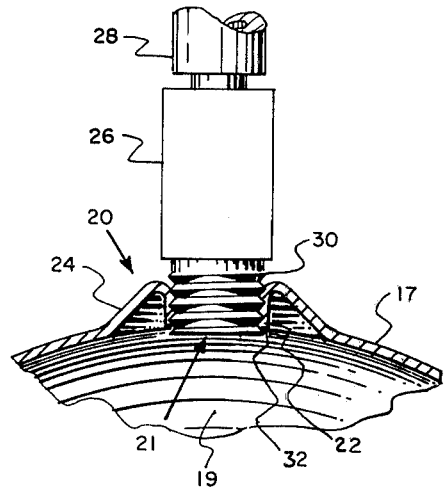
FIG. 3 is an enlarged vertical section view taken along the line 3—3 of FIG,. 1.

As shown in FIGS. 2 and 3, the safety connector 20 of the present invention includes an annular hole 21 surrounded by an internally threaded cylindrical connector portion 22 whose outer end is joined to the top of a conical projection 24 extending outwardly from the cylindrical side wall portion 17 of the pressure tank. The hole 21, cylindrical connector portion 22, and the conical projection 24 are formed by simultaneously punching and stamping the cylindrical side wall 17 of the tank. Then the cylindrical connector portion is threaded. An external fitting 26 connected to a hose 28 and having an externally threaded end 30, is inserted into the connector 20 so that the threads at the end 30 of the fitting are screwed into the internal threads of the cylindrical connector portion 22. The threaded cylindrical portion 22 may be provided with tapered pipe threads so that the fitting 26 is held in the tightened position shown in FIG. 2. It should be noted that the lower end 32 of the threaded connector portion 22 extends below the bottom of the conical projection 24 and is substantially in alignment with the inner surface of the cylindrical side wall portion 17.

Figure 4:
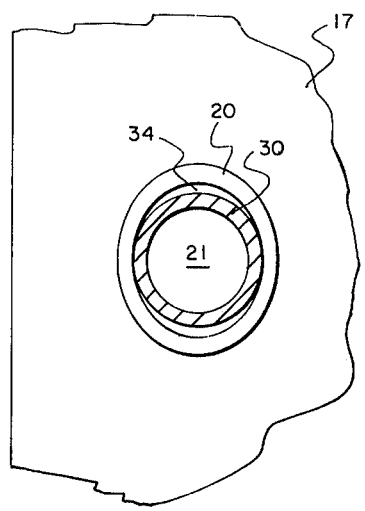
FIG. 4 is an enlarged horizontal view taken along the line 4—4 of FIG. 2 showing the safety connector of the present invention after it has been deformed and operated as an auxiliary safety valve.

When the pressure tank has undergone an overpressurized condition exceeding a predetermined pressure which is the safety limit of the pressure tank, but below the bursting pressure of the tank such tank expands to deform the annular connector 20, as shown in FIG. 4. For tanks made of welded sheet metal, this expansion is primarily radial, while for tanks made of drawn metal, the expansion is primarily longitudinal. Thus, the deformed connector of FIG. 4 would be produced using a welded tank. This deformation causes the threaded cylindrical connector portion 22 to assume a slightly oval cross sectional shape with the result that the air or other pressurized fluid within the pressure tank is gradually released from the tank through the resulting space 34 formed between the treads of the connector and the threads on the end 30 of the fitting. This leakage space 34 is shown greatly exaggerated in size in FIG. 4, for purposes of clarity.

While the preferred embodiment of the present invention has been described as a safety connector for an air pressure tank, the present invention is suitable on any type of pressure tank, including those containing a pressurized liquid or gas.

It will be obvious to those having ordinary skill in the art that many changes may be made in the above described details of the preferred embodiment of the present invention without departing from the spirit of the invention. Therefore, the scope of the present invention should only be determined by the following claims.

I claim:

1. In a brake system for a vehicle, the improvement of a tank safety connector apparatus comprising:
   a pressure tank for holding gas at greater than atmospheric pressure, having a cylindrical side wall portion and a pair of opposite end portions closing the opposite ends of said side wall portion;
   means for connecting said tank to said brake system;
   safety connector means provided on the side wall portion of said tank for transmitting said gas through an opening in said side wall portion; and
   said connector means including a threaded connector portion surrounding said opening, adapted to receive an insert member, said threaded connector being formed integral with the cylindrical side wall portion of the tank so that said threaded connector deforms when the pressure within the said tank exceeds a predetermined pressure below the bursting pressure of said tank and acts as a safety valve to cause the gas with said tank to slowly leak out through the resulting space between the insert member and said threaded connector.

2. Connector apparatus in accordance with claim 1 in which the threaded connector portion is joined to the cylindrical side wall portion by a conical projection portion.

3. Connector apparatus in accordance with claim 1 in which the threaded connector includes an internally threaded cylinder portion whose outer end is joined to the top of a conical projection portion extending outwardly from the side wall portion of the tank.

4. Connector apparatus in accordance with claim 3 in which the inner end of the treaded cylindrical portion terminates at the bottom of the conical projection.

5. Connector apparatus in accordance with claim 1 in which the connector means is connected to a threaded fitting engaging the threaded connector portion.

6. Connector apparatus in accordance with claim 1 in which the connector means is connected to a threaded plug engaging the threaded connector portion.

7. Connector apparatus in accordance with claim 1 in which the tank contains pressurized gas.

8. Connector apparatus in accordance with claim 7 in which the tank is an air tank connected to an air brake system of a vehicle.

9. Connector apparatus in accordance with claim 1 in which the tank was hemispherical end portions.

10. Connector apparatus in accordance with claim 1 in which the connector means is formed by simultaneously punching and stamping the cylindrical side wall portion of the tank.

* * * * *

UNITED STATES PATENT OFFICE
CERTIFICATE OF CORRECTION

PATENT NO. : 4,033,369
DATED : July 5, 1977
INVENTOR(S) : RUSSELL D. KELLER

It is certified that error appears in the above-identified patent and that said Letters Patent are hereby corrected as shown below:

Column 1, line 22, after "usually" insert --been--.

Column 4, line 17, "with" should be --within--.

Column 4, Claim 4, line 30, "treaded" should be --threaded--.

Column 4, Claim 9, line 44, "was" should be --has--.

Signed and Sealed this

Twentieth Day of September 1977

[SEAL]

Attest:

RUTH C. MASON
Attesting Officer

LUTRELLE F. PARKER
Acting Commissioner of Patents and Trademarks